(12) United States Patent
Shiota et al.

(10) Patent No.: US 6,192,184 B1
(45) Date of Patent: Feb. 20, 2001

(54) PICTURE PRINT GENERATING METHOD AND SYSTEM, AND RECORDING MEDIUM

(75) Inventors: Kazuo Shiota, Tokyo; Shuichi Ohtsuka; Nobuyoshi Nakajima, both of Kanagawa-ken; Norihisa Haneda, Saitama-ken; Sugio Makishima, Saitama-ken; Hiroshi Tanaka, Saitama-ken, all of (JP)

(73) Assignee: Fuji Photo Film Co., Ltd., Kanagawa-Ken (JP)

( * ) Notice: Under 35 U.S.C. 154(b), the term of this patent shall be extended for 0 days.

(21) Appl. No.: 08/970,394

(22) Filed: Nov. 14, 1997

(30) Foreign Application Priority Data

Nov. 18, 1996 (JP) .................................................. 8-306272

(51) Int. Cl.[7] .............................. H04N 5/87; H04N 5/76
(52) U.S. Cl. .............................. 386/52; 386/127; 386/128
(58) Field of Search .................................. 386/52, 55, 64, 386/46, 95, 127, 128, 131, 1, 4, 107, 117, 38, 42

(56) References Cited

U.S. PATENT DOCUMENTS 5,126,851 * 6/1992 Yoshimura et al. .................... 386/52
5,568,275 * 10/1996 Norton et al. ......................... 386/52

FOREIGN PATENT DOCUMENTS

0392753 A2  10/1990 (EP).
0589724 A2   3/1994 (EP).

OTHER PUBLICATIONS

"Virtual Image Editing," IBM Technical Disclosure Bulletin, vol. 39, No. 08, Aug. 1996, pp. 93–96.

* cited by examiner

*Primary Examiner*—Robert Chevalier

(57) ABSTRACT

When a picture print is generated by editing a picture image recorded on a film, the print in accordance with a customer's requirements is generated by simple operations and at a low cost. Low resolution image data of a picture image read from a film are recorded in a recording medium, in addition to software for image editing, and provided to a customer so that the customer can carry out editing operations on the picture using a personal computer or the like. When a print is ordered, editing instruction information generated by recording the operations the customer has carried out for the editing is received from the customer via the recording medium. Based on the editing instruction information, a scanner reads a film in high resolution and a printer outputs a print after automatic editing on the image data.

7 Claims, 1 Drawing Sheet

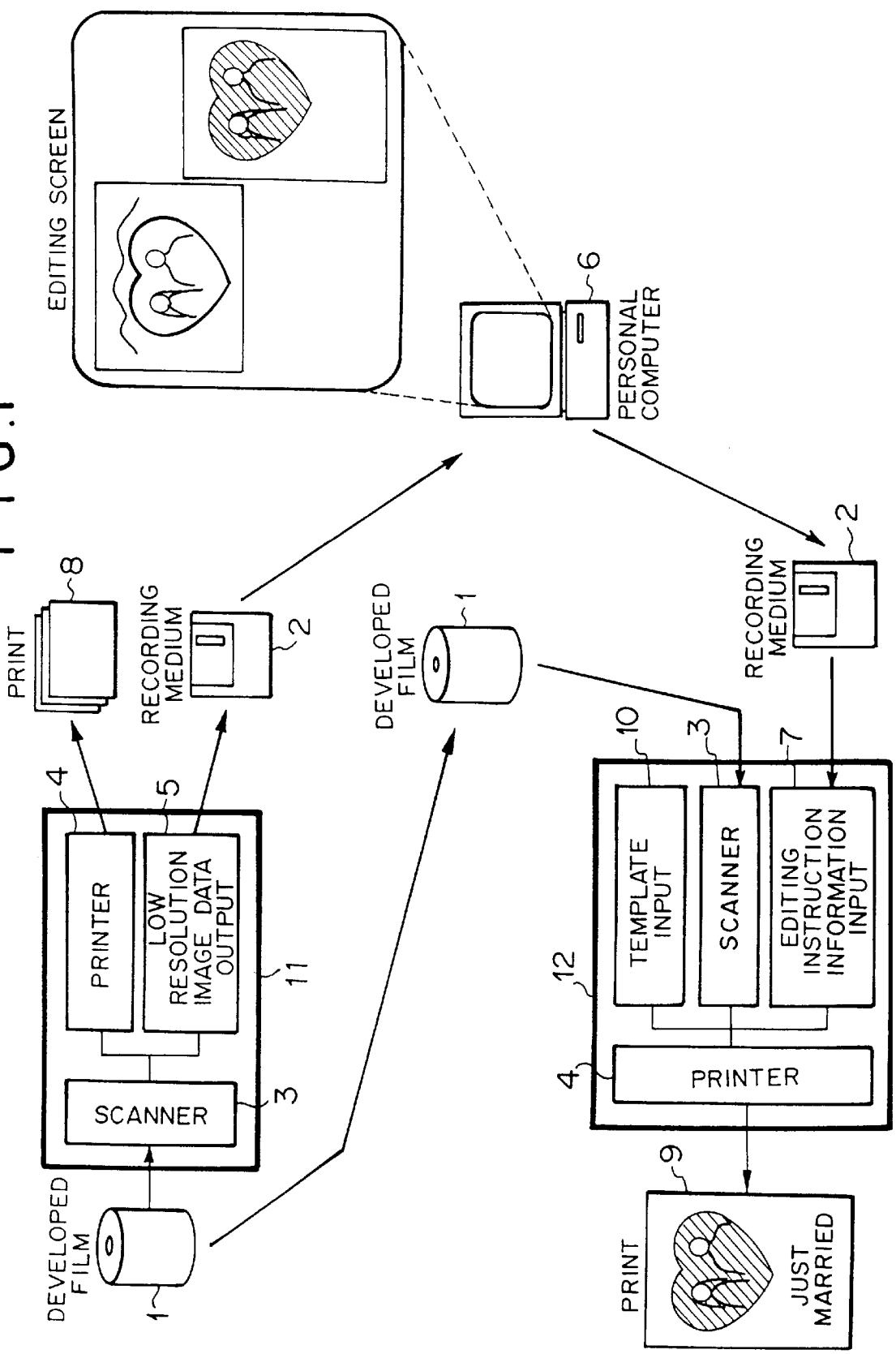

PICTURE PRINT GENERATING METHOD AND SYSTEM, AND RECORDING MEDIUM

BACKGROUND OF THE INVENTION

1. Field of the Invention

The present invention relates to a method and a system for generating an edited picture print such as prints edited for an album print, and also to a recording medium for recording a program for the method.

2. Description of the Related Art

A printing service for generating a picture postcard, a creative calendar and the like, using a picture recorded by a customer, has been known. In such a service, a negative film or a print deposited by a customer is usually read by a scanner to digitize the picture image. After editing processing according to a customer's requirements has been carried out on the picture image, the picture image is printed. The editing processing herein referred to means determining a layout, trimming processing, and combining the picture image with an illustration or characters, for example. A customer's requirements regarding editing are usually conveyed to a service provider by pointing out an area to be trimmed using a drawing, or by selecting a desired layout or an illustration among samples prepared in advance.

Meanwhile, software for editing picture image data on a personal computer has been known. By taking in a picture image as digital image data using a medium such as a photo CD, the software can, for example, select a necessary picture image, position or trim the picture image, and combine the picture image with characters and an illustration.

In the printing service described above, an operator in a laboratory or the like carries out an actual editing operation, referring to a drawing a customer has drawn, for example. Therefore, it is not necessarily guaranteed that a print comes out as the customer expects. It is not rare that an area having been trimmed is not the area the customer wanted to trim, or that a position of a character string is slightly different from the position that a customer wants to place the character string at.

In the case where a large number of picture images positioned in a complex layout for an album are generated, the workload on the customer has been heavy, because detailed instructions should be provided to an operator. Furthermore, since the workload on the operator is naturally heavy in the case such as mentioned above, it is inevitable that the service provider raises the service charge.

If a customer orders a service provider to carry out a printing service by providing image data which have already been edited by the customer using the software described above for example, the intention of the customer is reliably conveyed. However, it is necessary to use a large capacity recording medium, since such high resolution image data that they can be printed out by both the service provider and the customer should be exchanged.

Nevertheless, a large capacity recording medium such as an MO disc or a ZIP disc is costly compared with a floppy disc and the like, and it is not preferable to put the cost on the service charge. Moreover, such a large capacity recording medium is far less prevalent among general households than a floppy disc. Therefore, imposing restrictions on a medium may hinder spreading of the service.

SUMMARY OF THE INVENTION

Based on consideration of the problems described above, an object of the present invention is to provide a picture print generating method for generating a picture print according to a customer's requirements with a simple operation and at a low cost.

The picture print generating method of the present invention is a picture print generating method for generating a picture print by editing a picture image recorded on a film, comprising the steps of carrying out a variety of operations for the editing using low resolution image data of the picture image, recording the operations as editing instruction information, and generating the picture print by carrying out automatic editing on high resolution picture image data of the picture image, based on the editing instruction information having been recorded.

The picture print generating system of the present invention for generating a picture print according to the above method is a picture printing system for generating a picture print by editing a picture image recorded on a film, comprising a film scanner for reading the film, low resolution image data obtaining means which obtains low resolution image data of the picture image and records the low resolution image data in a predetermined recording medium, editing means which enables operations for the editing to be carried out using the low resolution image data recorded in the recording medium while recording the operations having been carried out in a predetermined recording medium as editing instruction information, and print generating means which generates the picture print by carrying out automatic editing of high resolution image data of the picture image based on the editing instruction information recorded in the recording medium. It is preferable that the print generating means is a digital printer.

"The low resolution image data" herein referred to may be generated by roughly reading the film by the film scanner, or by carrying out pixel number converting processing on high resolution image data read by the film scanner. In other words, "the low resolution image data obtaining means" may be a film scanner or a combination of a film scanner and a pixel number converting processing means. The film scanner for reading the high resolution image data and the film scanner used for obtaining the low resolution image data may be a single scanner or two separate scanners.

"The predetermined recording medium" for recording the low resolution image data means a recording medium such as a floppy disc used by a personal computer or the like. An MO disc or a ZIP disc may also be used as the recording medium. However, since a large capacity is not necessary for recording the low resolution image data, it is preferable to use a less costly medium, emphasizing cost rather than capacity. If a communication means can be used for sending the low resolution image data from a service provider to a customer, the recording medium can be a hard disc or the like.

"The editing means" herein referred to concretely means a personal computer in which software for image editing as described above is installed. A recording medium which stores a program of the present invention is equivalent to a recording medium storing such a software program. Using this program, a personal computer displays, on a display apparatus, the low resolution image data stored in the predetermined recording medium, enables a variety of operations for the editing by an input device to be carried out using the displayed low resolution image data, and records the operations having been carried out as the editing instruction information in the predetermined recording medium.

"Enables a variety of operations for the editing" herein referred to means, for example, that low resolution image data and a menu of editing operations are displayed on a display screen of a personal computer so that a user can, for example, select a frame to be included in the prints, designate the area to be trimmed, position a picture image or an illustration, and input characters to be included in the prints, by using an input device such as a mouse or a keyboard.

"Recording in a predetermined recording medium operations having been carried out as the editing instruction information" herein referred to means to record, for example, a selected menu, coordinates pointed out by a mouse or the like, and a character string input by a keyboard, in a predetermined format. In other words, the editing instruction information means information such as the selected frame number, the shape of the area designated to be trimmed, the size and the coordinates of the area, the coordinates of each positioned image, the content of the character string input, the coordinates of the character string, and the font and the size of the character string. However, the coordinates to be stored as the editing instruction information are not the coordinates on the display screen. The coordinates represent the position relative to the low resolution image data displayed on the display screen in the case of a trimming instruction, and the position in the print to be generated in the case of a layout instruction. That is, all information necessary for automatically repeating the editing operation carried out by a customer in another environment (apparatus) is recorded as the editing instruction information, which enables "the print generating means" to carry out "the automatic editing".

"The predetermined recording medium" for storing the editing instruction information may be the same as, or different from, the recording medium wherein the low resolution image data have been stored. For easier handling by the print generating means, a recording medium united with a film cartridge for storing a film (for example, a non-volatile memory implanted in a film cartridge) may be used as the recording medium. Alternatively, the editing instruction information may be simply recorded in a hard disc or the like of a personal computer and transferred to a service provider via a network using a separately provided communication means.

The high resolution image data may be read and recorded at the time the low resolution image data are obtained. Alternatively, upon generating a print, the print generating means may order the film scanner to read high resolution image data of a picture image necessary for the editing, based on the editing instruction information.

In a laboratory or the like, a large number of customers' films are often dealt with at once. Therefore, it is preferable that the low resolution image data obtaining means records, in the recording medium, low resolution image data as well as film identifying information for identifying the film on which the picture image represented by the low resolution image data has been recorded, and the print generating means compares the film having the picture image recorded in the recording medium with the film set in the film scanner, based on the film identifying information.

It is preferable to use a film stored in a film cartridge. In this manner, the film is easier to deal with, and an automatic changer which automatically searches for and sets in the film scanner the film cartridge containing the film identified by the film identifying information among a plurality of stored film cartridges which are ready to be taken out upon necessity can be installed in the picture print generating system, for example. In this case, the film identifying information may be the information for identifying the film cartridge.

The picture print generating method and system of the present invention enables a customer to carry out an editing operation on a picture by providing low resolution image data of a picture image read from a film and software for image editing to the customer. In this manner, editing instruction information which records editing operations carried out by the customer, instead of edited image data, is received upon an order of a print, and automatic editing on high resolution image data of the customer's picture image can be carried out based on the editing instruction information.

A picture print generated by automatic editing can thus reflect a customer's intention with certainty. Furthermore, a workload of a service provider is reduced, since it becomes unnecessary for the service provider to carry out an editing operation. Moreover, since the data exchanged between a customer and a service provider contain only low resolution image data and editing instruction information for an order, a medium with a small capacity but a low price can be used for the exchange, which leads to a reduction in cost.

Upon generating a print, if it is judged whether or not a picture image should be included in picture prints by referring to the editing instruction information and only high resolution image data necessary for the prints are read based on the information, an equipment cost for storing the high resolution image data is reduced, because only necessary data are read upon necessity.

When film reading is carried out upon generating a print, if the low resolution image data in addition to the film identifying information for identifying a film are recorded in the predetermined recording medium, it becomes possible to examine whether or not the recording medium and the film set in the scanner correlate to each other, based on the film identifying information. Therefore, erroneous film selection is avoidable upon generating a print.

By using a film stored in a film cartridge, the film can be easily dealt with. If an automatic changer for automatically searching for a necessary film cartridge among a plurality of stored film cartridges which are ready to be taken out upon necessity and for setting the searched cartridge in the scanner is installed in the picture print generating system, effectiveness of the reading processing upon generating a print can be improved.

By using a non-volatile memory or the like implanted in a film cartridge as the recording medium in which the editing instruction information is recorded, correlation between the film and its recording medium becomes easy and confirmation processing by the comparison described above or the like can be omitted.

According to the recording medium in which the program of the present invention is recorded, it becomes possible for a customer to use his/her personal computer as the editing means having the function for recording the editing instruction information by installing the program in the personal computer via the recording medium.

BRIEF DESCRIPTION OF THE DRAWING

FIG. 1 is a schematic diagram of a picture print generating system of the present invention.

DESCRIPTION OF THE PREFERRED EMBODIMENT

Hereinafter, a picture print generating method and system of the present invention will be explained referring to the accompanying drawing. FIG. 1 shows a flow of processing in the present invention starting from ordering a print and ending in providing the print.

In this system, when a laboratory system 11 carries out first printing, a scanner 3 reads a film 1 which has already been developed, and a print 8 is generated by a printer 4, while low resolution image data read by a low resolution image data outputting means 5 are generated and output to a recording medium 2 as a file. The printer 4 may be a printer generally used in a laboratory system.

The low resolution image data outputting means 5 may be an image processing apparatus or a medium drive for example, and low resolution image data are generated through a reduction in the number of pixels of high resolution image data read for outputting a print by carrying out filtering processing or the like on the high resolution image data. Alternatively, the low resolution image data may be obtained by a reading for outputting a low resolution image data file separately from the reading for high resolution image data for outputting a print. In each case, the generated low resolution image data are output to the recording medium 2 via an outputting device such as a floppy disc drive.

The low resolution image data are used when editing such as layout and trimming is carried out on a display screen of a personal computer. Therefore, it is preferable that the low resolution image data have such a resolution that the resolution does not cause a problem when the image data are edited on the monitor. More specifically, the resolution at which a person's facial expression can be identified is sufficient. It is preferable to lower the resolution to such a degree that the low resolution image data of picture images recorded on one film can be recorded in one floppy disc which is a medium in wide use. Alternatively, the low resolution image data may be recorded after compression thereof upon necessity.

On this occasion, software for editing, a template used for editing such as a background image or an illustration, order receiving software or the like for generating order information such as the number of prints, in addition to the low resolution image are recorded in the recording medium 2. The template is recorded at a resolution lower than the resolution of the template used for actual printing, as are the picture image data. The template may also be compressed upon necessity. The above software and the template need not necessarily be recorded in the same medium in which the low resolution image data are recorded, and may be provided after recorded in a separate recording medium. The recording medium 2 and a print 8 are handed to a customer. In the case of the APS, the film 1 which has already been developed is also handed to the customer.

The customer who receives the recording medium 2 can edit a picture image on a display screen of a personal computer 6 by installing, in the personal computer, editing software recorded in the recording medium 2 or another recording medium. The editing software is like Photo Factory of the Fuji Photo Film Co., Ltd. which is widely available on the market. The editing software can display a picture image on the display screen of the personal computer, and carry out image selection, trimming, color correction, layout or the like of the image on the screen, using an inputting device such as a mouse.

Generally, such editing software is used for re-storing image data which have already been edited in a recording medium so that the image can be appreciated later on a display screen. The editing software which is the editing means of the present invention has not only such a function but also the function which generates editing instruction information by recording operations carried out by an editor using a display screen, such as the kind of a menu or the coordinates pointed out by a mouse. The editing instruction information is recorded as information in a data format predetermined by the personal computer and a printer which should process the image by recognizing the editing instruction information.

The editing instruction information generated as described above is recorded in the recording medium 2 and turned in a laboratory together with the developed film 1. The laboratory system 12 reads the editing instruction information from the recording medium 2 by a reading and editing instruction information inputting means 7 such as a floppy disc drive. The film feeding mechanism of the scanner 3 is controlled so that only a frame necessary for editing is read based on the editing instruction information having been read. Likewise, high resolution data of a template necessary for the editing are input by a template inputting means. Alternatively, the high resolution template data may be accumulated and stored in a disc of the laboratory system 12 in advance so that the data may be searched for later.

As described above, the prepared high resolution image data, high resolution template data and the like are automatically edited (for example, trimmed or positioned) based on the editing instruction information, and output by the printer 4 in the form of a print 9.

A laboratory generally deals with a large number of customers' films at once. Therefore, a comparison may be carried out upon generating a print so that the combination of the film and the recording medium 2 is not mistaken. For this purpose, the recording medium 2 records the film identifying information for identifying the film 1 when a file is output by the low resolution image data outputting means 5. In this manner, the laboratory system 12 can examine whether or not the film set in the scanner 3 is the film pointed out by the editing instruction information.

Instead of the film 1 and the recording medium 2, a memory implanted in a film cartridge may be used. If a mechanism for reading and writing data from and in the memory is incorporated in the laboratory system 12 or peripheral equipment of the personal computer, a correlation between the film 1 and the recording medium 2 becomes known without carrying out the above comparison.

Conveyance of the editing instruction information to the laboratory system 12 may be carried out through a network instead of the recording medium 2. In this case, the developed film 1 should all be stored in the laboratory without being returned to customers. Therefore, for easier management of the film, it is preferable to incorporate, in the laboratory system 12, an automatic changer function which automatically searches for a film among a plurality of films and sets the searched film in the scanner. In other words, if the film identifying information is used, it becomes possible for a necessary film to be automatically set in the scanner by reading the editing instruction information.

What is claimed is:

1. A picture print generating method which generates a picture print by editing a picture image recorded on a film, comprising the steps of;

carrying out a variety of operations for editing using low resolution image data of the picture image while recording the operations as editing instruction information and film identifying information on a recording medium; and generating the picture print by carrying out automatic editing of high resolution image data of the picture image, based on the recorded editing instruction information;

wherein a film stored in a film cartridge is used as the film; and automatically searching for and setting in a scanner a film cartridge storing the film identified by a reproduced film identifying information among a plurality of pre-stored film cartridges which are ready to be taken out upon necessity.

2. A picture printing system which generates a picture print by editing a picture image recorded on a film, comprising;

a film scanner which reads the film;

a low resolution image data obtaining means which obtains low resolution image data of the picture image and records the low resolution image data and film identifying information in a predetermined recording medium;

an editing means which enables the variety of operations for editing to be carried out using the low resolution image data recorded in the recording medium while recording, in a predetermined recording medium, the operations having been carried out as editing instruction information; and a print generating means which carries out automatic editing on high resolution image data of the picture image, based on editing instruction information recorded in the predetermined recording medium and generates the picture print;

wherein a film stored in a film cartridge is used as the film; and an automatic changer which automatically searches for and sets in a scanner a film cartridge storing the film identified by a reproduced film identifying information among a plurality of pre-stored film cartridges which are ready to be taken out upon necessity.

3. A picture print generating system as defined in claim 2 wherein the print generating means orders the film scanner to read high resolution image data of the picture image, the data being necessary for the editing, based on the editing instruction information.

4. A picture print generating system as defined in claim 2 wherein the print generating means is a digital printer.

5. A picture print generating system as defined in claim 3 wherein the low resolution image data obtaining means records film identifying information for identifying a film on which a picture image represented by the low resolution image data is recorded, in addition to the low resolution data in the recording medium and;

the print generating means compares the film recorded in the recording medium with the film set in the film scanner, based on the film identifying information.

6. A picture print generating system as defined in claim 2 wherein the recording medium which records the editing instruction information therein is united with the film cartridge storing the film.

7. A recording medium which stores a program by which a computer performs the processing which is carried out by the editing means as defined in claim 2, the program comprising the steps of;

displaying low resolution image data recorded in the predetermined recording medium on a display apparatus;

carrying out the variety of processing for the editing using an input device, with the displayed low resolution image data; and storing, in the predetermined recording medium, the operations having been carried out as editing instruction information.

* * * * *